Aug. 29, 1967 R. H. ANDERSON 3,339,099
COMBINED DIRECT VIEWING STORAGE TARGET AND FLUORESCENT
SCREEN DISPLAY STRUCTURE
Filed May 31, 1966 2 Sheets-Sheet 1

ROBERT H. ANDERSON
INVENTOR
BY
BUCKHORN, BLORE, KLARQUIST & SPARKMAN
ATTORNEYS

Aug. 29, 1967 R. H. ANDERSON 3,339,099

COMBINED DIRECT VIEWING STORAGE TARGET AND FLUORESCENT SCREEN DISPLAY STRUCTURE

Filed May 31, 1966 2 Sheets-Sheet 2

ROBERT H. ANDERSON
INVENTOR

BY
BUCKHORN, BLORE, KLARQUIST & SPARKMAN
ATTORNEYS

United States Patent Office 3,339,099
Patented Aug. 29, 1967

3,339,099

COMBINED DIRECT VIEWING STORAGE TARGET AND FLUORESCENT SCREEN DISPLAY STRUCTURE

Robert H. Anderson, Portland, Oreg., assignor to Tektronix, Inc., Beaverton, Oreg., a corporation of Oregon Filed May 31, 1966, Ser. No. 554,177
10 Claims. (Cl. 313—68)

The subject matter of the present invention relates generally to electron image display apparatus, and in particular to direct viewing bistable storage tubes which employ a combined storage target and fluorescent screen display structure formed by an array of alternate portions of phosphor storage dielectric and fluorescent screen coated on a common support member. The present combined display structure enables the light images of stored and non-stored electron images to be produced simultaneously by the storage dielectric and fluorescent screen portions, respectively, on the same general area of the support member.

The combined storage target and fluorescent screen disply element of the present invention is especially useful in a direct viewing bistable storage tube of the type which is employed as the signal display device of a cathode ray oscilloscope. However, the present combined display structure can also be employed in the display tube of a sonar or radar apparatus, as well as in the cathode ray tube of a closed circuit television receiver or in the display tube of a data transmission system for remotely reproducing a document by transmitting an electrical signal corresponding to the image of such document over telephone lines, or by microwave communication apparatus.

The direct viewing bistable storage target employed in the apparatus of the present invention may be in the form of a thin integral layer of phosphor material of the type described in my copending United States patent application, Ser. No. 180,457, filed Mar. 19, 1962, now Patent No. 3,293,473. Thus the storage dielectric may be an integral or undivided layer of phosphor material having a sufficiently porous structure to enable secondary electrons emitted from the bombarded side of such layer to be transmitted through the layer and collected by a light transparent conductive film on the opposite side of such layer. Alternatively it is also possible to provide the storage dielectric in the form of a plurality of separate dots of phosphor material so that such dots can be of a greater thickness to produce a light image of greater brightness and still provide bistable storage. However in either case the storage dielectric is formed of phosphor material coated on a support plate which may be made of glass or other light transparent insulating material to provide an extremely simple, rugged and inexpensive storage target structure. It is also possible to make the support plate of metal or other light opaque material when the target is viewed from its electron bombarded side.

In addition a fluorescent screen of phosphor material is also provided as a coating on the same support plate as the storage target so that the portions of such fluorescent screen are intermixed with the portions of phosphor storage dielectric to provide an array of alternate storage and non-storage regions of phosphor material. The fluorescent screen portions may be made of a different thickness or of a different phosphor material than the storage dielectric so that such fluorescent screen portions can be optimized for maximum brightness, even if this prevents the screen portion from storing a bistable charge image under the same conditions as will cause the storage dielectric to store such a bistable charge image. This enables both a stored and non-stored electron image to be displayed simultaneously on the same general area of the support member which may be the glass face plate of a cathode ray tube as mentioned above.

The combined storage target and fluorescent screen display structure of the present invention is in some respects an improvement on the "split screen" storage target shown in my previous U.S. Patent No. 3,214,631 issued Oct. 26, 1965. Thus while my previous split screen storage tube is capable of displaying stored and non-stored electron images simultaneously on different areas of the face plate of the storage tube by applying different D.C. voltages to the two separate light transparent conductive areas provided beneath the phosphor storage dielectric which function as collector electrodes, the present combined display structure is capable of displaying stored and non-stored electron images simultaneously on the same area of the face plate. In addition the non-storage fluorescent screen portions in the combined display structure of the present invention can be made of a greater thickness and covered with a light reflecting coating to greatly increase the brightness of the light image emitted from such fluorescent screen. As a result a cathode ray tube employing the combined fluorescent screen and storage target of the present invention operates in the manner of a conventional high performance cathode ray tube having a fast writing rate and high brightness and is also capable of bistable storage. Thus the present storage tube is capable of "write through" since it can produce a non-stored trace on the same region as a stored trace without erasing such stored trace. In addition, such tube is also capable of "no penalty" operation in which there is no penalization of reduced brightness for a non-stored trace compared to the brightness of a conventional high performance cathode ray tube having no bistable storage capability, as usually occurs in previously known direct viewing storage tubes. Therefore the apparatus of the present invention is much more versatile than either conventional cathode ray tubes or previous direct viewing bistable storage tubes. The combined storage target and fluorescent screen display structure of the present invention is simpler, stronger and less expensive than grid control or mesh type storage targets and separate fluorescent screens employed in previous direct viewing bistable storage tubes. In addition the present combined display structure is further simplified by employing the light reflecting conductive layer which increases the brightness of the fluorescent screen, also as the collector electrode which collects the secondary electrons emitted from the storage dielectric.

It is therefore one object of the present invention to provide an improved electron image display apparatus which is more versatile and can produce the light image of both a stored electron image and a non-stored electron image simultaneously on the same display area for close comparison or other purposes.

Another object of the present invention is to provide an improved electron image display apparatus which is capable of producing a non-stored trace of high brightness similar to that of a conventional cathode ray tube, and is also capable of bistable storage.

A further object of the present invention is to provide a combined display structure including a direct viewing storage target and a fluorescent screen which are both formed by phosphor material applied to a common support member to provide a simple, rugged and inexpensive construction.

An additional object of the present invention is to provide a combined direct viewing bistable storage target and fluorescent screen in which portions of phosphor storage dielectric are intermixed with portions of fluorescent screen to provide an array of alternate storage and non-storage regions which enable the light images of a stored electron image and a non-stored electron image to be produced simultaneously on the same general display area.

Other objects and advantages of the present invention will be apparent from the following detailed description of certain preferred embodiments thereof and from the attached drawings of which:

Figures 1, 2, 3, 4, 5:
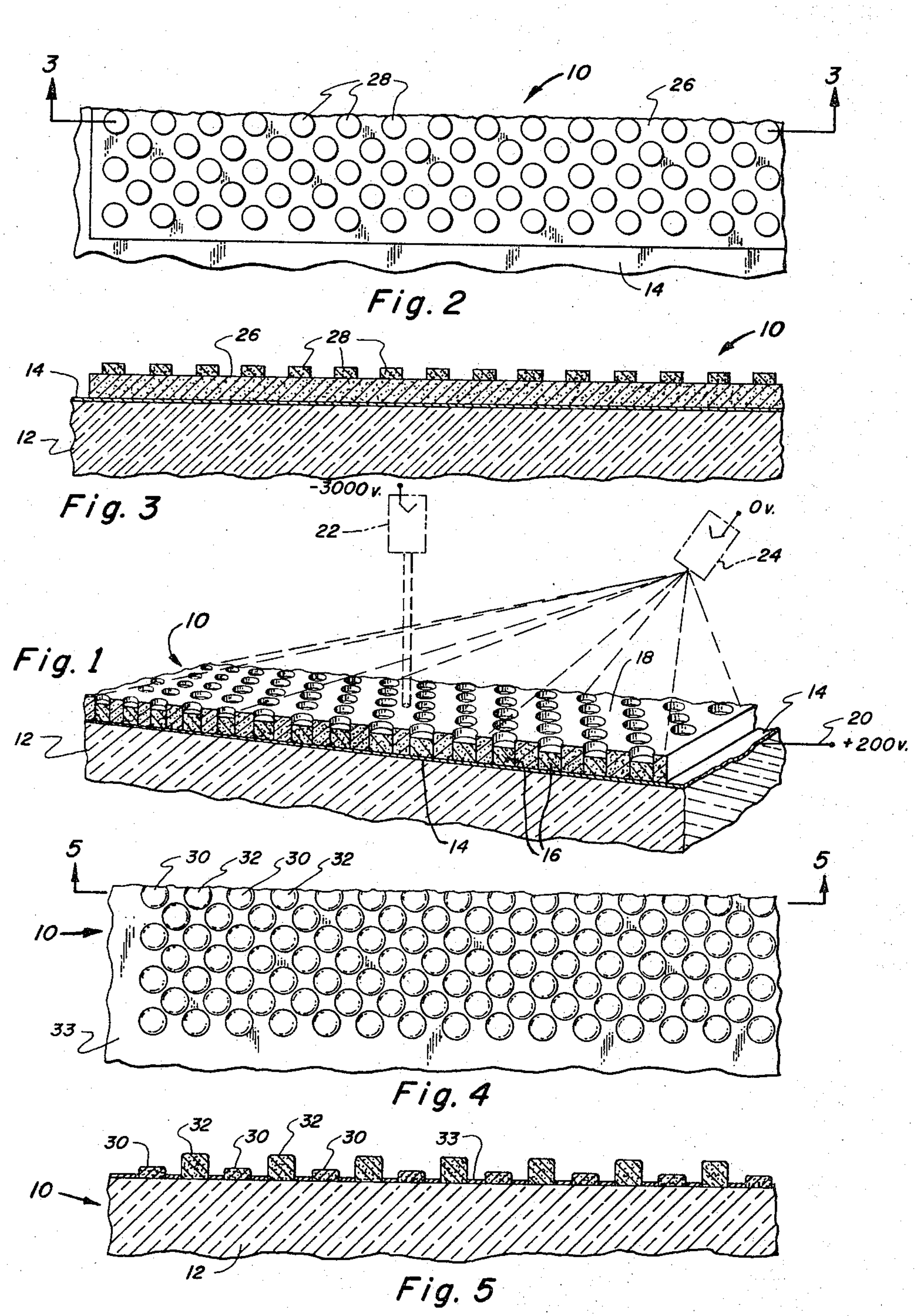
FIG. 1 is an oblique elevation view partially in section showing one embodiment of the combined direct viewing storage target fluorescent screen display structure of the present invention on an enlarged scale, together with a schematic representation of electron guns employed to produce and store an electron image on such display element.
FIG. 2 is a plan elevation view of another embodiment of the combined storage target fluorescent screen structure of the present invention, shown upon an enlarged scale.
FIG. 3 is a horizontal section view taken along the line 3—3 of FIG. 2.
FIG. 4 is a plan elevation view of a further embodiment of the combined storage target and fluorescent screen display structure of the present invention.
FIG. 5 is a horizontal section view taken along the line 5—5 of FIG. 4.

As shown in FIG. 1 one embodiment of the combined storage target and fluorescent screen display structure 10 includes a flat, light transparent support plate 12 of glass or other insulating material having a light transparent conductive coating 14 of tin oxide or other similar material applied to one side of such support plate in a conventional manner. A bistable storage dielectric in the form of a plurality of separate dots 16 of phosphor material is provided on the support plate 12 over the conductive coating 14. These storage dielectric dots may be made of P–1 type phosphor material in a circular, hexagonal or any other desired cross sectional shape. The storage dielectric dots 16 are uniformly distributed over the support plate in a rectangular, circular, hexagonal or other shaped array. Surrounding the storage dielectric dots 16 is an integral mesh-shaped layer 18 of phosphor material which forms the fluorescent screen of the display structure and contains such dots in the mesh holes. The fluorescent screen layer 18 may also be of P–1 type phosphor material but of a larger thickness than the storage dots 16 so that such fluorescent screen is capable of higher non-stored image brightness even though such a screen layer is not capable of bistable storage under the same operating conditions which will cause such dots to store. However the fluorescent screen layer 18 may be formed of a different type of phosphor material, such as P–31 type phosphor which emits substantially the same yellow green colored light as the P–1 phosphor storage dots, but is of a greater brightness. Alternatively the fluorescent screen can be of a different color light emitting phosphor for greater contrast, such as P–11 type phosphor which emits a blue light or P–22 type phosphor which emits red light. Also the storage dielectric portions and the fluorescent screen portions can be exchanged so that the screen portions are provided by dots 16 and the storage portions by integral mesh shaped layer 18.

The transparent conductive coating 14 is connected to a source of variable D.C. bias voltage through a lead conductor 20 which may extend through a seal between glass support plate 12 and a ceramic funnel member (not shown) which together form the envelope of a cathode ray tube with such support plate providing the face plate of such tube. While the voltage on the collector electrode provided by transparent conductive coating 14 may be varied to enable erasing and non-storage operation, when it is of the +200 volt value indicated the storage dielectric 16 will be capable of bistable storage. Thus an electron image formed on the storage dielectric dots 16 by a beam of high velocity electrons emitted from writing electron gun 22 having its cathode connected to a negative D.C. voltage of, for example, −3000 volts, will be stored bistably for a long time on the order of an hour or more, as long as such storage dielectric dots are bombarded with low velocity electrons emitted from a flood electron gun 24 having its cathode connected to a D.C. bias voltage of 0 volt. It should be noted that the fluorescent screen layer 18 can be made to store bistably at a different D.C. voltage on the collector electrode 14 than that which enables the dots 16 to store so both are capable of storage at different times. Of course the writing beam of high velocity electrons is deflected in a conventional manner by suitable electrostatic or electromagnetic deflection means provided as part of electron gun 22, in order to form the electron image on the display structure 10 of the signal being investigated. On suitable direct viewing bistable storage tube within which the present combined storage target and fluorescent screen can be employed is shown in my copending U.S. patent application Ser. No. 180,457 mentioned above, which also discussed the bistable storage operation in greater detail.

At the same time the writing gun 22 forms the stored image, it also produces an electron image on the fluorescent screen 18 which, like the phosphor storage dielectric emits a light image corresponding to such electron image but however does not store such electron image. Thus when the writing beam is deflected across the surface of display structure 10 both a stored light image and a non-stored light image are formed simultaneously on the same general area of such display structure. As a result of this combined display structure the electron images of extremely short rise time or high frequency signals which cannot be stored because they are beyond the "writing rate" of the storage target, can still be clearly seen on the fluorescent screen due to the increased brightness of such screen. In addition the high brightness fluorescent screen areas can also be used for previewing a signal waveform with the collector voltage on lead 20 adjusted below the minimum voltage necessary for storage until the desired waveform is observed, at which time the collector voltage may be increased to enable bistable storage of such signal waveform on the storage dielectric dots 16.

When the writing gun 22 has formed the stored image, the writing beam may then be reduced in current so that it will not store on dots 16, and a slightly or greatly different image may be displayed in the same general area as the stored image. Such image may consist of a non-stored "write through" oscilloscope waveform trace of slightly or greatly different shape than a stored trace, and the stored and non-stored traces may repeatedly cross or coincide with each other. The reduced current non-store image is produced on the fluorescent screen 18, which is capable of producing higher brightness than formerly was obtained from such reduced current, since screen 18 may be separately optimized for non-stored write-through brightness, because screen 18 is not being depended upon to have storage capability.

Of course the present combined display structure 10 can also be operated as a high brightness fluorescent screen of fast writing rate, when storage is not desired. The brightness and writing rate in such a non-storage mode of operation may be only slightly reduced compared to a conventional high performance fluorescent screen, if only a relatively small fraction of the target area is devoted to the storage dots 16, thus providing the "no-penalty" non-storage mode of operation. It should be noted that in order to increase the brightness of a non-stored trace the fluorescent screen portions can be made thicker, greater in area or of a different phosphor than the storage dielectric portions. While a greater phosphor thickness may increase brightness about 1¾ times and the use of a more efficient light emitting phosphor can improve brightness approximately 3 times, the greatest increase of brightness of a non-stored trace can be accomplished by providing a larger area of fluorescent screen portions. Obviously a compromise must be made since any increase in the area of the fluorescent screen means a decrease in the areas of the storage dielectric and a resulting decrease in brightness of the stored trace.

As an added feature of the present display structure 10, transparent conductive coating 14 may be divided into several insulated conductive areas so that the phosphor storage dielectric dots above such areas can be controlled independently by varying the voltages applied thereto to provide a split screen storage target in the manner indicated in my U.S. Patent 3,214,631.

Another embodiment of the combined storage target and fluorescent screen display structure of the present invention is shown in FIGS. 2 and 3 which is similar to that in FIG. 1 except the storage dielectric is in the form of an integral or undivided layer 26 of phosphor material which is sufficiently thin to enable bistable storage as disclosed in my copending application Ser. No. 180,457 mentioned previously. The integral phosphor layer 26 has a sufficiently porous structure to enable secondary electrons emitted from the bombarded surface of such layer to be transmitted through the phosphor layer and collected on the light transparent conductive coating 14 provided on the opposite side thereof. The non-storage fluorescent screen portions of the display structure 10 are formed by a plurality of separate dots 28 of phosphor material provided on the upper surface of the phosphor layer 26. The fluorescent screen dots 28 may be of the same P–1 type phosphor material as the storage dielectric 26 but are not capable of bistable storage due to the greater thickness of the composite phosphor portions provided by such dots and the storage dielectric layer 26. Alternatively the fluorescent screen dots 28 may be provided of a different phosphor material, such as P–31, P–20, or P–22 type phosphor if so desired. The thicker phosphor portions or those of a brighter phosphor are capable of high brightness even when the writing beam current has been reduced to avoid storage.

The third embodiment of the combined display structure 10 is shown in FIGS. 4 and 5. While the embodiment of FIG. 1 shows separate storage dielectric dots 16 and an integral fluorescent screen 18 and the embodiment of FIGS. 2 and 3 employs an integral storage dielectric 26 and fluorescent screen dots 28, the embodiment of FIGS. 4 and 5 discloses a third combination in which separately spaced dots are employed for both the storage dielectric and for the fluorescent screen. Thus storage dielectric dots 30 and fluorescent screen dots 32 of phosphor material are provided in contact with the surface of the glass support plate 12 surrounded by a conductive collector electrode film 33 coated on the remaining surface portions of such support plate. If the fluorescent screen dots 32 are made of P–1 phosphor material, they are of greater thickness, for example 2 times, than storage dielectric dots 30 of P–1 phosphor to enable bistable storage on dots 30 while producing a non-stored image of high brightness on dots 32 for a given collector voltage applied to conductive film 33. Thus the fluorescent screen dots 32 are intermixed with the storage dots 30 to provide an array of alternate storage and non-storage regions. Of course if a different phosphor material is used for the fluorescent screen dots 32 than is used for the storage dots 30, such dots may be of the same thickness. Also while the conductive film 33 can be a light transparent coating of tin oxide, it may also be a light opaque coating of aluminum, silver or other metal since it is located only between the dots 30 and 32. Also a continuous nonporous light transparent conductive layer like layer 14 of FIG. 1, can be used in place of film 33.

While the preceding embodiments are satisfactory, they suffer somewhat from reduced brightness due to the fact that no light reflecting coating is provided over the fluorescent screen. Also there is a certain amount of background lighting of the fluorescent screen due to bombardment thereof by the low velocity flood electrons. Both of these deficiencies are overcome by the fourth and fifth embodiments of the combined display structure shown in FIGS. 6, 7 and FIGS. 8, 9.

Figure 6:
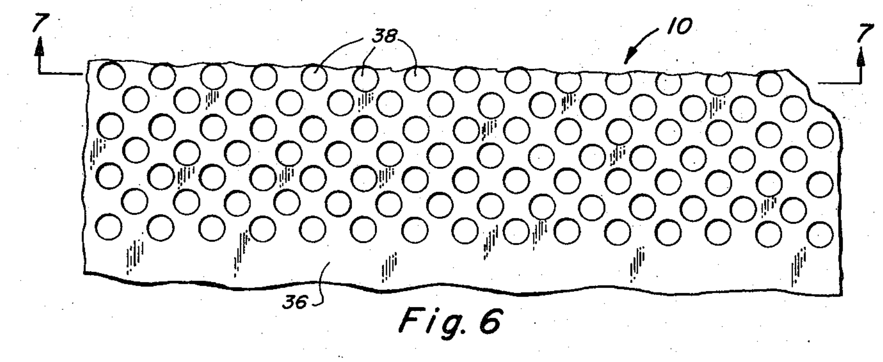
FIG. 6 is a plan elevation view of a fourth embodiment of the combined storage target and fluorescent screen display structure of the present invention.
Figure 7:
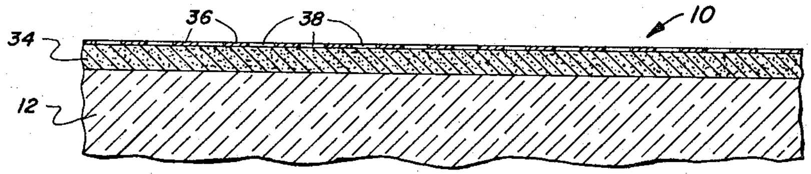
FIG. 7 is a horizontal section view taken along the line 7—7 of FIG. 6.

As shown in FIGS. 6 and 7, a fourth embodiment of the combined storage target and fluorescent screen display structure 10 may be in the form of a single integral or undivided layer of phosphor material 34 having different portions which function as the storage dielectric and as the fluorescent screen. This phosphor layer 34 may be made of either P–1 or a different type phosphor material, such as P–31 phosphor. A thin light reflecting conductive layer 36 of aluminum, silver or other suitable metal is provided on the upper surface of the phosphor layer 34, such light reflecting layer being provided with a plurality of holes 38. The high velocity electrons of the writing beam are transmitted through the thin metal of the light reflecting conductive layer 36 to excite the phospher layer 34 and produce a light image in the manner of a conventional cathode ray tube. However the low velocity flood electrons are not transmitted through the metal of the light reflecting layer 36 and only strike those portions of the phosphor layer 34 exposed through holes 38 in such reflecting layer to cause secondary electron emission from such portions of the phosphor layer. As a result the electron image produced on the storage dielectric portions of the phosphor layer 34 beneath the holes 38 is stored as a bistable charge image. However an electron image produced on the fluorescent screen portions of the phosphor layer 34 lying beneath the land areas of the reflecting layer 36 is not stored, due to the fact that the low velocity flood electrons do not cause secondary electron emission from such fluorescent screen portions. Also because they do not reach the fluorescent screen portions such flood electrons do not cause undesirable background illumination which tends to reduce image contrast, and do not drive the screen potential to the low voltage stable point which tends to reduce the brightness of non-stored images by lowering the beam accelerating voltage.

The light reflecting conductive layer 36 of FIG. 7 also functions as a collector of the secondary electrons emitted from the storage dielectric portions of phosphor layer 34 beneath holes 38. By contacting the bombarded surface of the integral phosphor layer 34 the light reflecting collector electrode 36 electrically isolates the storage dielectric dot portions of such layer and enables such storage dielectric dots to store a bistable charge image even if such phosphor layer does not have the thin porous structure of the phospher layer 26 of FIG. 3 previously discussed. However it should be noted that by reducing the thickness of the storage dielectric dot portions beneath the holes 38, such storage dielectric portions of the phosphor layer 34 will store a bistable charge image more easily.

Figure 8:
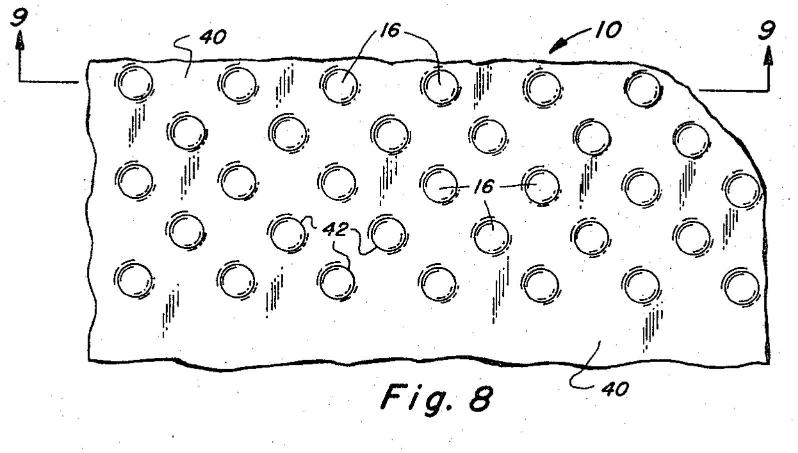
FIG. 8 is a plan elevation view of a fifth embodiment of the storage target and fluorescent screen display structure of the present invention.
Figure 9:
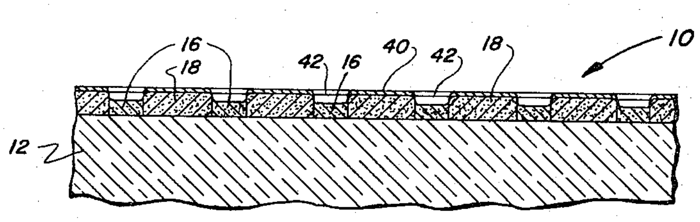
FIG. 9 is a horizontal section view taken along the line 9—9 of FIG. 8.

A fifth embodiment of the present invention is shown in FIGS. 8 and 9 which is similar to the embodiment of FIG. 1 except that the light transparent conductive coating 14 is replaced with a light reflecting layer 40 of aluminum, silver or the like which is coated over the outer surface of the fluorescent screen 18. In addition, the light reflecting layer 40 is provided with a plurality of holes 42 in registration with the storage dielectric dots 16 so that the low velocity flood electrons can strike such storage dots to enable bistable storage. Like the embodiment of FIG. 7, the light reflecting layer 40 also functions as a collector of secondary electrons emitted from the phosphor storage dielectric dots 16. In addition, it should be noted that positioning the collector electrode 40 so that it surrounds the storage dielectric dots adjacent the upper surface of such dots greatly increases the writing speed of the storage target by reducing the capacitance between such collector electrode and the bombarded surface of such dielectric. In this regard the embodiments of FIGS. 8, 9 and FIGS. 4, 5 are similar to that shown in copending U.S. patent application Ser. No. 299,422, filed Aug. 1, 1963, by Charles B. Gibson. However, the present display structure is an improvement over that described in the above-mentioned patent since it enables the light images of a stored electron image and a non-stored electron image to both be displayed simultaneously on the same display area. In addition, the patent application discloses photographic methods of manufacture of high image resolution dot pattern storage targets which can be employed to produce the combined display structure of the present invention.

It will be obvious to those having ordinary skill in the art that many changes may be made in the details of the above-described embodiments of the present invention without departing from the spirit of the invention. For example, both a light transparent collector electrode layer, such as layer 14, and a light reflecting layer, such as layer 36, can be employed in the same display structure. Therefore, the scope of the present invention should only be determined by the following claims.

I claim:

1. An electron image display apparatus including combined direct viewing storage target and fluorescent screen, comprising:

a support member of light transparent insulating material;

a fluorescent screen of phosphor material supported on one side of said support member;

a storage dielectric of phosphor material supported on said one side of said support member so that portions of said storage dielectric and said fluorescent screen are intermixed to provide an array of alternate storage regions of phosphor which are capable of bistable storage and nonstorage regions of phosphor which are incapable of bistable storage under the same conditions, said storage regions and nonstorage regions beings separate but intermixed to enable the light images of a stored electron image and a nonstored electron image to be produced simultaneously on the same general area of the support member; and a layer of conductive material secured to said one side of said support member in a position to collect secondary electrons emitted from the storage dielectric to enable bistable storage of an electron image thereon.

2. A display apparatus in accordance with claim 1 in which the conductive layer is a light transparent conductive film applied to the surface of the support member.

3. A display apparatus in accordance with claim 1 in which the conductive layer is a light reflecting layer applied only over the fluorescent screen portions so that said conductive layer also functions to increase the brightness of the light image emitted by said screen portions.

4. A display apparatus in accordance with claim 3 in which the fluorescent screen portions and the storage dielectric portions are different parts of an integral phosphor layer and the conductive layer is provided with holes therethrough in registration with the storage dielectric portions.

5. A display apparatus in accordance with claim 1 in which the storage dielectric portions are of less thickness than the fluorescent screen portions.

6. A display apparatus in accordance with claim 1 in which the storage dielectric portions are of a different phosphor material than the fluorescent screen portions.

7. A display apparatus in accordance with claim 1 in which the storage dielectric portions are spaced dots of phosphor and the fluorescent screen portions are parts of an integral layer of phosphor surrounding such dots.

8. A display apparatus in accordance with claim 2 in which the fluorescent screen portions are spaced dots of phosphor and the storage dielectric portions are provided by an integral phosphor layer which is sufficiently porous to enable secondary electrons emitted from the bombarded side of the phosphor layer to be transmitted through such phosphor layer and collected by the conductive film on the opposite side thereof.

9. A display apparatus in accordance with claim 1 in which the storage dielectric portions and the fluorescent screen portions are both spaced dots of phosphor secured to the surface of the support member and the conductive layer is coated on said surface of said support member only between said dots.

10. A display apparatus in accordance with claim 1 which also includes:

means for producing a writing beam of high velocity electrons and moving said writing beam across said fluorescent screen portions and said storage dielectric portions to form the electron image thereon; and means for bombarding said storage dielectric portions with low velocity electrons to enable an electron image to be stored bistably on said storage dielectric portions.

No references cited.

JAMES W. LAWRENCE, *Primary Examiner.*

R. SEGAL, *Assistant Examiner.*